United States Patent
Cheng et al.

(10) Patent No.: US 7,796,950 B2
(45) Date of Patent: Sep. 14, 2010

(54) DUAL MODE GSM AND WLAN MOBILE COMMUNICATION DEVICE

(75) Inventors: Ching-Ying Cheng, Shenzhen (CN); Shii-Rong Den, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 981 days.

(21) Appl. No.: 11/309,864

(22) Filed: Oct. 16, 2006

(65) Prior Publication Data
US 2007/0202869 A1 Aug. 30, 2007

(30) Foreign Application Priority Data
Dec. 30, 2005 (CN) .......................... 200510121392

(51) Int. Cl.
*H04B 1/00* (2006.01)

(52) U.S. Cl. .................................................. 455/63.1

(58) Field of Classification Search ................ 455/63.1
See application file for complete search history.

(56) References Cited

U.S. PATENT DOCUMENTS

| | | | | |
|---|---|---|---|---|
| 5,732,341 A | * | 3/1998 | Wheatley, III | ............ 455/234.1 |
| 6,014,551 A | * | 1/2000 | Pesola et al. | .................. 455/86 |
| 6,118,984 A | * | 9/2000 | Yu-Hong | .................... 455/76 |
| 6,535,748 B1 | * | 3/2003 | Vuorio et al. | ............ 455/552.1 |
| 2002/0025778 A1 | * | 2/2002 | Lee | ........................... 455/3.05 |
| 2003/0124982 A1 | | 7/2003 | Saari et al. | |
| 2005/0255878 A1 | * | 11/2005 | Leinonen et al. | ......... 455/552.1 |
| 2008/0046542 A1 | * | 2/2008 | Sano | .......................... 709/218 |

FOREIGN PATENT DOCUMENTS

| | | |
|---|---|---|
| JP | 2004-320244 A | 11/2004 |
| JP | 2005-354407 A | 12/2005 |
| TW | 1233278 | 5/2005 |

\* cited by examiner

*Primary Examiner*—Matthew D Anderson
*Assistant Examiner*—David Bilodeau
(74) *Attorney, Agent, or Firm*—Raymond J. Chew (57) ABSTRACT

A mobile communication device (1000) includes a CPU (1300), a first antenna (1110), a first front-end circuit (1120), a second antenna (1210), and a second front-end circuit (1220). The first antenna transmits and receives first signals. The first front-end circuit, located between the first antenna and the CPU, includes a first switch (1122), a first power amplifier (1124), and a first filter. The second antenna transmits and receives second signals. The second front-end circuit, located between the second antenna and the CPU, includes a second switch (1221), a second power amplifier (1223), a second filter (1222), and at least one third filter (1224). The second switch is connected to the second antenna. The second power amplifier amplifies signals from the CPU. The second filter is connected to the second switch and the second power amplifier. The third filter is connected to the second switch.

13 Claims, 8 Drawing Sheets

| Band-pass filter | Frequency (MHz) | Specification |
|---|---|---|
| Insertion loss | 2400-2500 | 2.1dB Max |
| Attenuation | 1710-1990 | 48dB Min |

FIG. 4

| High-pass filter | Frequency (MHz) | Specification |
|---|---|---|
| Insertion loss | 2400-2482 | 0.8dB Max |
| Attenuation | 1790 | 17dB Min |
| Attenuation | 1915 | 20dB Min |

FIG. 5

| Notch filter | Frequency (MHz) | Specification |
|---|---|---|
| Insertion loss | 1710-1910 | 0.8dB Max |
| Attenuation | 2400-2500 | 10dB Min |

DUAL MODE GSM AND WLAN MOBILE COMMUNICATION DEVICE

FIELD OF THE INVENTION

The invention relates to wireless communication devices, and particularly to a mobile communication device.

DESCRIPTION OF RELATED ART

In conventional dual mode mobile communication devices, such as personal digital assistants (PDAs) and mobile phones, interference in communication may occur when both modes of the device are operated at the same time.

Figure 1:
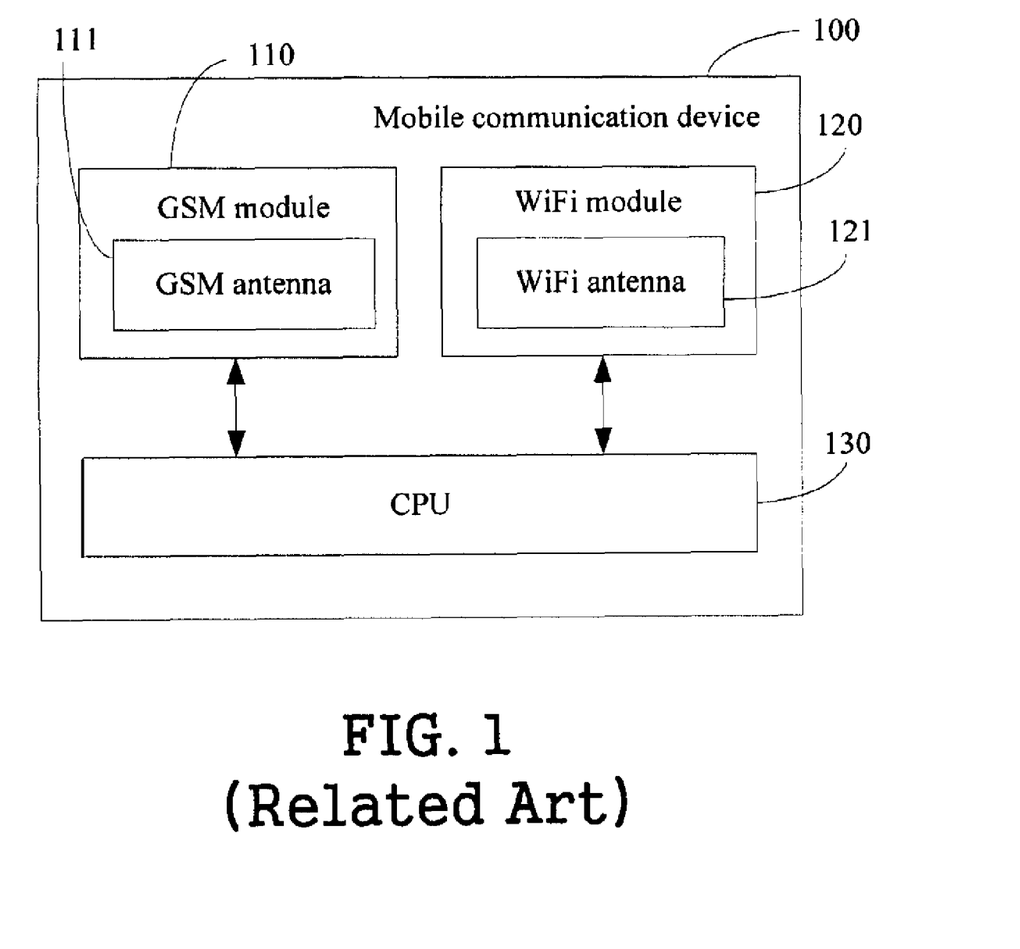
FIG. 1 is a schematic diagram of a conventional dual mode mobile communication device.

FIG. 1 is a schematic diagram of a conventional dual mode mobile communication device 100. The conventional dual mode mobile communication device 100 includes a GSM module 110, a WiFi module 120, and a central processing unit (CPU) 130. The GSM module 110 includes a GSM antenna 111, and the WiFi module 120 includes a WiFi antenna 121. The GSM module 110 operates at 1900 MHz, and the WiFi module 120 operates at 2400 MHz. The GSM antenna 111 and the WiFi antenna 121 are both located at a top side of the mobile communication device 100. Transmission of signals by the GSM module 110 may interfere with reception of signals by the WiFi module 120.

One type of interference is receiver out of band interference. The transmitting power of the GSM module 110 at the transmitting band is coupled to the receiving band of the WiFi module 120 via the GSM antenna 111 and the WiFi antenna 121, hence generating a third-order intermodulation signal. If the third-order intermodulation signal is too strong, the third-order intermodulation signal will result in demodulation distortion of receiving signals of the WiFi module 120.

Figure 2:
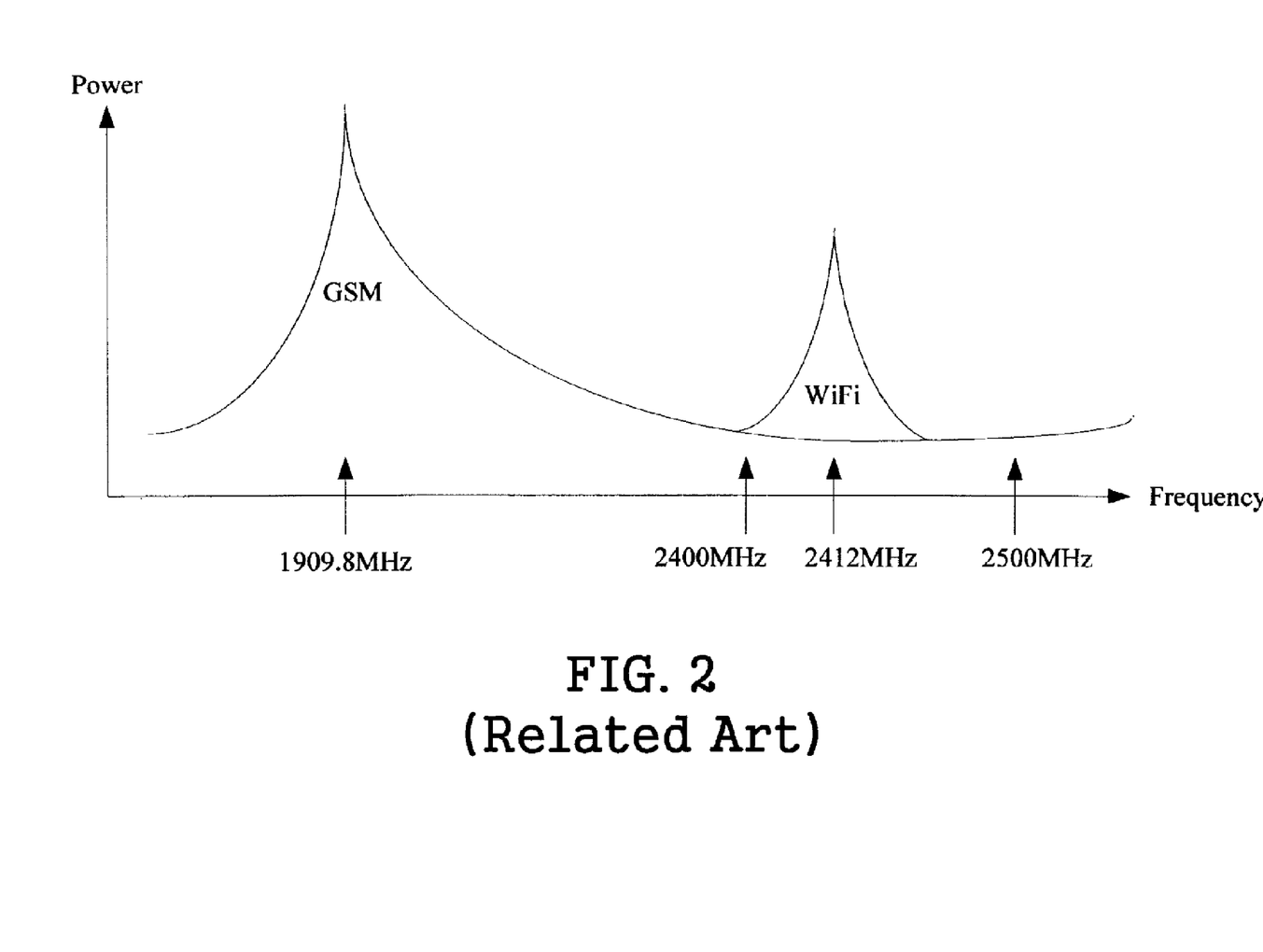
FIG. 2 is a schematic diagram of transmitter noise interference of FIG. 1.

A second type of interference is transmitter noise interference. Referring to FIG. 2, the transmitting subsidiary power of the GSM module 110 at 2400 MHz is coupled to the receiving band of the WiFi module 120 via the GSM antenna 111 and the WiFi antenna 121, resulting in that the noise-floor level of the WiFi module 120 is increased. If the noise-floor level is too high, the noise-floor level will also result in the demodulation distortion of the receiving signals of the WiFi module 120.

SUMMARY OF THE INVENTION

An exemplary embodiment of the invention provides a mobile communication device. The mobile communication device includes a central processing unit (CPU), a first antenna, a first front-end circuit, a second antenna, and a second front-end circuit. The CPU processes signals. The first antenna transmits and receives first signals. The second antenna transmits and receives second signals.

The first front-end circuit is located between the first antenna and the CPU, and connected to the first antenna. The first front-end circuit includes a first switch, a first power amplifier, and a first filter. The first switch switches between transmitting and receiving functions of the first front-end circuit. The first power amplifier, connected to the first switch, amplifies signals from the CPU. The first filter, connected to the first switch, filters signals from the first antenna.

The second front-end circuit is located between the second antenna and the CPU, and connected to the second antenna. The second front-end circuit includes a second switch, a second power amplifier, a second filter, and at least one third filter. The second switch, connected to the second antenna, switches between transmitting and receiving functions of the second front-end circuit. The second power amplifier amplifies signals from the CPU. The second filter, connected to the second switch and the second power amplifier, filters signals from the second power amplifier. The third filter, connected to the second switch, filters signals from the second switch.

Other advantages and novel features will become more apparent from the following detailed description when taken in conjunction with the accompanying drawings, in which:

DETAILED DESCRIPTION OF THE INVENTION

Figure 3:
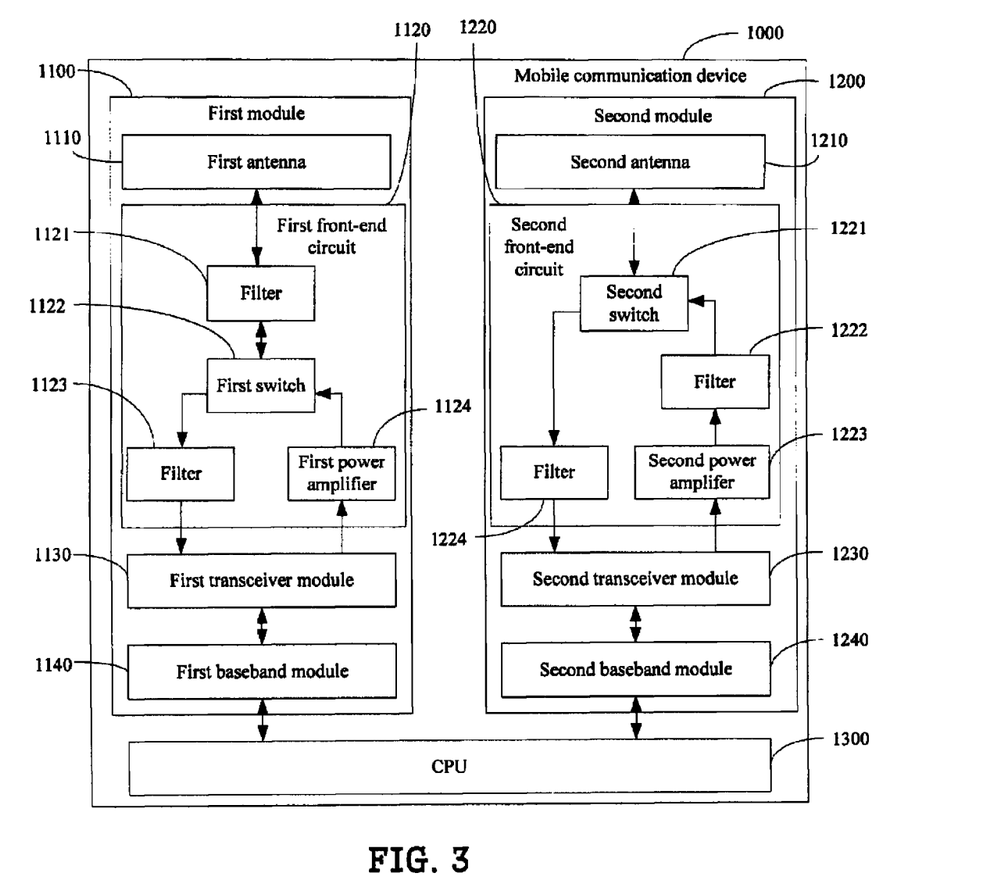
FIG. 3 is a schematic diagram of functional modules of a mobile communication device of an exemplary embodiment of the invention.

FIG. 3 is a schematic diagram of functional modules of a mobile communication device 1000 of an exemplary embodiment of the invention. In the exemplary embodiment, the mobile communication device 1000 includes a first module 1100, a second module 1200, and a central processing unit (CPU) 1300. The first module 1100 and the second module 1200 are both located at a side not used for gripping by a user of the mobile communication device 1000, avoiding interference because of handholding the mobile communication device 1000. The mobile communication 1000 may communicate with other communication devices via the first module 1100 and the CPU 1300. The mobile communication device 1000 may also communicate with other communication devices via the second module 1200 and the CPU 1300.

The first module 1100 and the second module 1200 may operate at two respective frequency bands. In the exemplary embodiment, the first module 1100 may be a WiFi module, which operates at a WiFi (IEEE 802.11b/g) band, namely 2400 MHz frequency band. The second module 1200 may be a global system for mobile communication (GSM) module, which operates at a GSM frequency band. In the exemplary embodiment, the GSM frequency band may include a 1900 MHz frequency band.

In other embodiments, the first module 1100 may also be other modules operating at other frequency bands. The second module 1200 may also be a general packet radio service (GPRS) module, an Enhanced data rate for GSM evolution (Edge) module or other modules. The GSM frequency band may further include 850 MHz, 900 MHz, and 1800 MHz.

The working frequency band of the second module 1200 may include 850 MHz, 900 MHz, 1800 MHz, and 1900 MHz. The 1900 MHz frequency band is closest to the working frequency band of the first module 1100, so interference between the first module 1100 and the second module 1200 are of the most concern when the second module 1200 operates at 1900 MHz.

The first module 1100 includes a first antenna 1110, a first front-end circuit 1120, a first transceiver module 1130, and a first baseband module 1140. The first antenna 1110 transmits and receives first signals. In the exemplary embodiment, the first signals may include WiFi (IEEE 802.11b/g) frequency band signals. The front-end circuit 1120 is connected to the first antenna 1110, and located between the first antenna 1110 and the CPU 1300. The front-end circuit 1120 filters signals.

The first baseband module 1140 is connected between the CPU 1300 and the first transceiver module 1130. The first baseband module 1140 modulates signals from the CPU 1300, and demodulates signals from the first transceiver module 1130. The first transceiver module 1130 is connected to the first front end circuit 1120 and the first baseband module 1140. The first transceiver module 1130 up converts signals from the first baseband module 1140, and down converts signals from the front-end circuit 1120.

In the exemplary embodiment, when the mobile communication device 1000 transmits voice signals via the first module 1100 and the CPU 1300, the CPU 1300 converts the voice signals to digital in-phase/quadrature (I/Q) signals. The first baseband module 1140 modulates the digital I/Q signals to analog I/Q signals. The first transceiver module 1130 up converts the analog I/Q signals. The first front-end circuit 1120 filters up-converted analog I/Q signals to remove noise signals. Then the first antenna 1110 transmits filtered signals.

When the mobile communication device 1000 receives signals with noise signals via the first module 1100 and the CPU 1300, the first antenna 1110 receives the signals with the noise signals. The first front-end circuit 1120 filters the signals with the noise signals, and sends the filtered signals, that are analog I/Q signals, to the first transceiver module 1130. The first transceiver module 1130 down converts the analog I/Q signals. The first baseband module 1140 demodulates the down-converted analog I/Q signals to digital I/Q signals. The CPU 1300 converts the digital I/Q signals to voice signals.

The first front-end circuit 1120 includes a filter 1121, a first switch 1122, a filter 1123, and a first power amplifier 1124. The first switch 1122 switches between transmitting and receiving functions of the first front-end circuit 1120. The first power amplifier 1124, connected to the first switch 1122 and the first transceiver module 1130, amplifies signals from the first transceiver module 1130.

The filter 1121, connected between the first antenna 1110 and the first switch 1122, filters signals from the first antenna 1110. In other embodiments of the present invention, the filter 1121 further filters signals from the first switch 1122. The other filter 1123, connected between the first switch 1122 and the first transceiver module 1130, filters signals from the first switch 1122. In the exemplary embodiment, the filter 1121 and the filter 1123 both pass a receiving frequency band (2400 MHz) of the first module 1100, and reject a transmitting frequency band (1900 MHz) of the second module 1200. Therefore, interference caused by transmission of signals by the second module 1200 during reception of signals by the first module 1100 is reduced.

Figure 4:
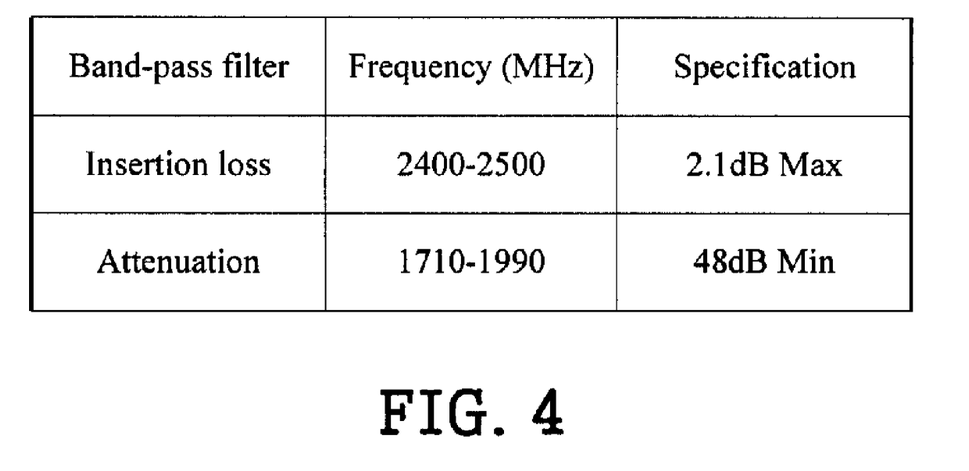
FIG. 4 is a table illustrating a specification of a band-pass filter of FIG. 3.
Figure 5:
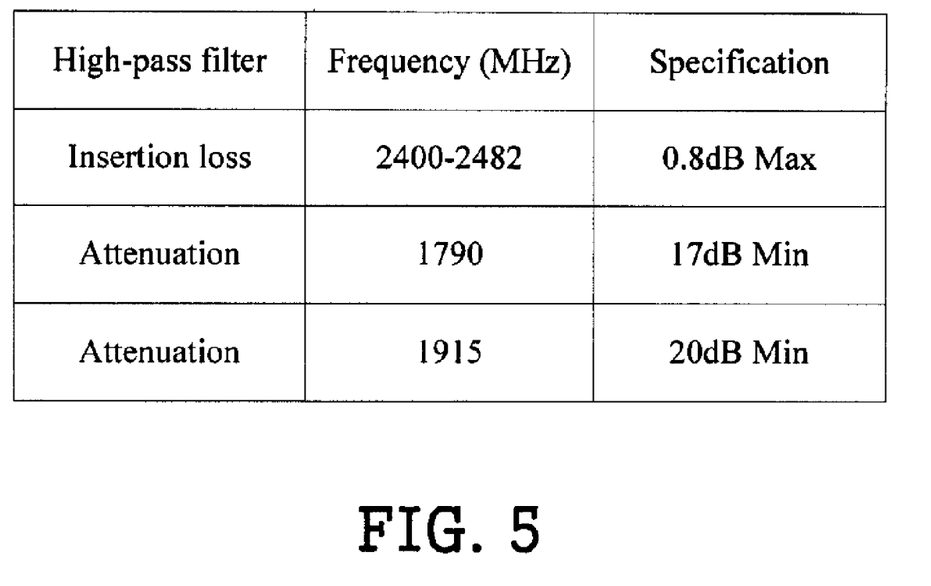
FIG. 5 is a table illustrating a specification of a high-pass filter of FIG. 3.

In the exemplary embodiment, the filter 1121 may be a band-pass filter, and a specification thereof is shown in FIG. 4. The filter 1123 may be a high-pass filter, and a specification thereof is shown in FIG. 5. Referring to FIG. 4, a maximum insertion loss of the filter 1121 at a frequency range of 2400-2500 MHz is 2.1 dB, and a minimum attenuation of the filter 1121 at a frequency range of 1710-1990 MHz is 48 dB. Referring to FIG. 5, a maximum insertion loss of the filter 1123 at a frequency range of 2400-2482 MHz is 0.8 dB, a minimum attenuation at 1790 MHz is 17 dB, and a minimum attenuation at 1915 MHz is 20 dB. Therefore, the filter 1121 and the filter 1123 pass the receiving frequency band (2400 MHz) of the first module 1100, and reject the transmitting frequency band (1900 MHz) of the second module 1200.

In other embodiments, the filter 1121 may be a high-pass filter. The filter 1123 may be a band-pass filter. The specifications of the filter 1121 and the filter 1123 may be designed according to different requirements.

The second module 1200 includes a second antenna 1210, a second front-end circuit 1220, a second transceiver module 1230, and a second baseband module 1240. The second antenna 1210 transmits and receives second signals. In the exemplary embodiment, the second signals may be GSM frequency band signals. The second front-end circuit 1220 is connected to the second antenna 1210, and located between the second antenna 1210 and the CPU 1300. The second front-end circuit 1220 filters signals.

The second baseband module 1240 is connected between the CPU 1300 and the second transceiver module 1230. The second baseband module 1240 modulates signals from the CPU 1300, and demodulates signals from the second transceiver module 1230. The second transceiver module 1230 is connected between the second front-end circuit 1220 and the second baseband 1240. The second transceiver module 1230 up converts signals from the second baseband module 1240, and down converts signals from the second front-end circuit 1220.

In the exemplary embodiment, when the mobile communication device 1000 transmits voice signals via the second module 1200 and the CPU 1300, the CPU 1300 converts the voice signals to digital I/Q signals. The second baseband module 1240 modulates the digital I/Q signals to analog I/Q signals. The second transceiver module 1230 up converts the analog I/Q signals. The second front-end circuit 1220 filters up-converted analog I/Q signals to remove noise signals. Then the second antenna 1210 transmits filtered signals.

When the mobile communication device 1000 receives signals with noise signals via the second module 1200 and the CPU 1300, the second antenna 1210 receives the signals with the noise signals. The second front-end circuit 1220 filters the signals with the noise signals, and sends the filtered signals, that are analog I/Q signals, to the second transceiver module 1230. The second transceiver module 1230 down converts the analog I/Q signals. The second baseband module 1240 demodulates the down-converted analog I/Q signals to digital I/Q signals. The CPU 1300 converts the digital I/Q signals to voice signals.

The second front-end circuit 1220 includes a second switch 1221, a filter 1222, a second power amplifier 1223, and at least one filter 1224. The second switch 1221, connected to the second antenna, switches between transmitting and receiving functions of the second front-end circuit 1220. In the exemplary embodiment, when the second front-end circuit 1220 includes more than one filter 1224, the second switch 1221 further switches between/among more than one filter 1224. The second power amplifier 1223 is connected to the second transceiver module 1230, and amplifies signals from the second transceiver module 1230.

Figure 6:
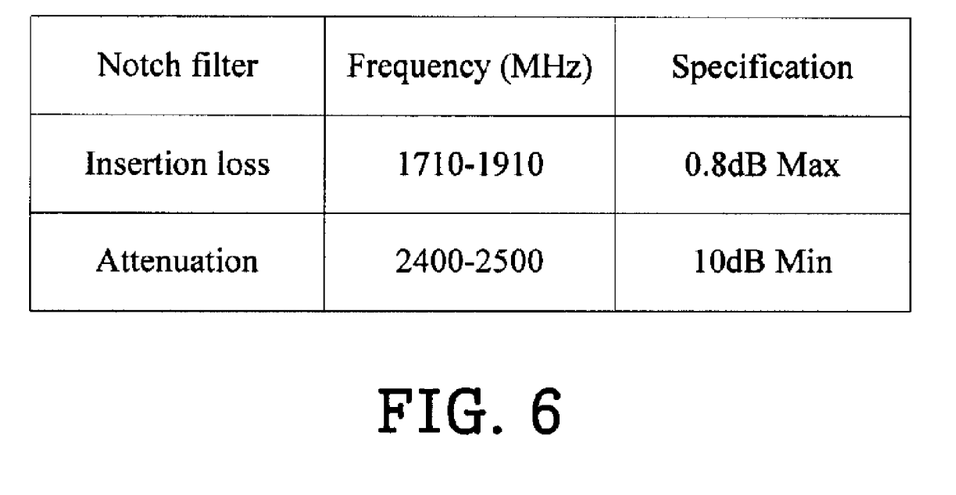
FIG. 6 is a table illustrating a specification of a notch filter of FIG. 3.

The filter 1222, connected between the second power amplifier 1223 and the second switch 1221, filters signals from the second power amplifier 1223. In the exemplary embodiment, the filter 1222 passes a transmitting frequency band (1900 MHz) of the second module 1200, and rejects a receiving frequency band (2400 MHz) of the first module 1100. Therefore, interference caused by transmission of signals by the second module 1200 during reception of signals by the first module 1100 is reduced. In the exemplary embodiment, the filter 1222 may be a notch filter, and a specification thereof is shown in FIG. 6. Referring to FIG. 6, a maximum insert loss of the filter 1222 at a frequency range of 1710-1910 MHz is 0.8 dB, and a minimum attenuation at 2400-2500 MHz is 10 dB. Therefore, the filter 1222 can pass the transmitting frequency band (1900 MHz) of the second module 1200, and reject the receiving frequency band (2400 MHz) of the first module 1100.

In other embodiments, the filter 1222 may be a band-pass filter or a low-pass filter, and specifications thereof may be designed according to different requirements.

The other filter 1224, connected between the second switch 1221 and the second transceiver module 1230, filters signals from the second switch 1221 to remove noise signals. In the exemplary embodiment, the second front-end circuit 1220 includes three filters 1224. The three filters 1224 are all band-pass filters, and band frequencies thereof are 900 MHz, 1800 MHz, and 1900 MHz, respectively.

Figure 7:
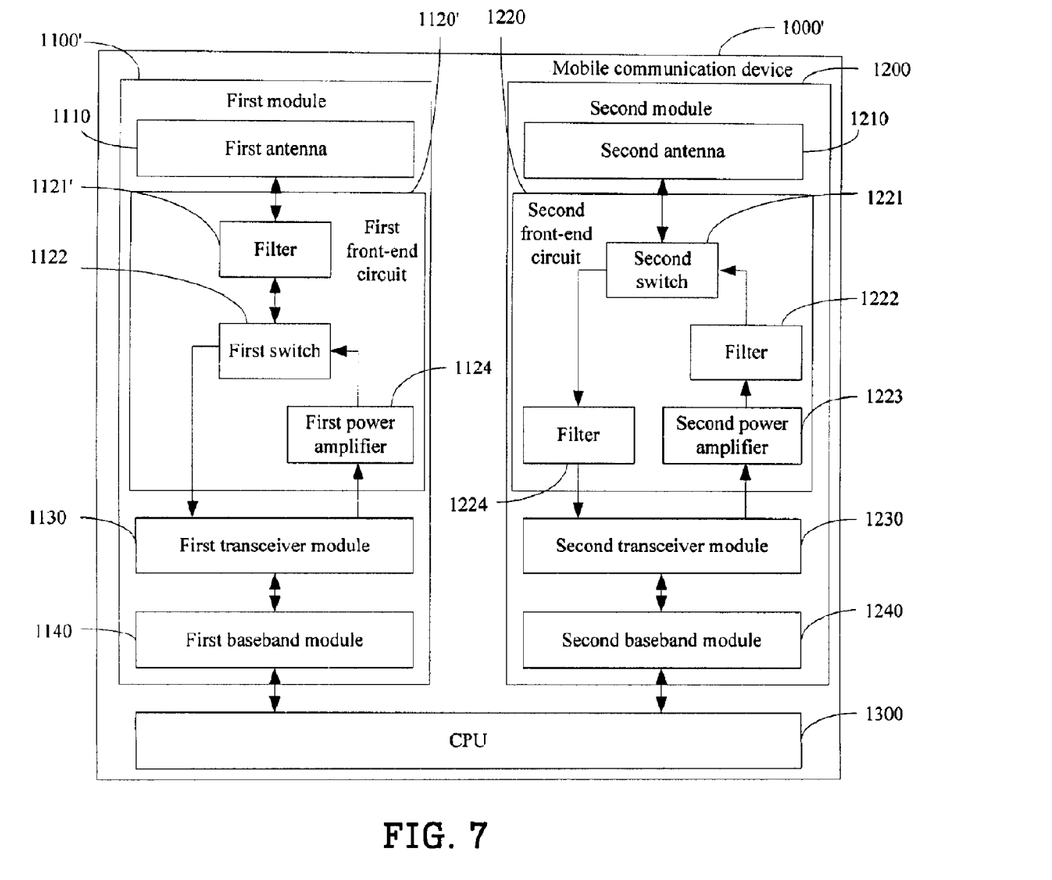
FIG. 7 is a schematic diagram of functional modules of a mobile communication device of another exemplary embodiment of the invention.

FIG. 7 is a schematic diagram of functional modules of a mobile communication device 1000' of another exemplary embodiment of the invention. The mobile communication device 1000' of this exemplary embodiment is similar to the mobile communication device 1000 of FIG. 3, with a difference being that a front-end circuit 1120' of the mobile communication device 1000' includes a filter 1121', a first switch 1122, and a first power amplifier 1124, eliminating the filter 1123 of FIG. 3. The first switch 1122 is located between the first antenna 1110 and the first transceiver module 1130. The first power amplifier 1124, connected between the first switch 1122 and the first transceiver module 1130, amplifies signals from the first transceiver module 1130. The filter 1121', connected between the first antenna 1110 and the first switch 1122, filters signals from the first antenna 1110 and signals from the first switch 1122.

In the exemplary embodiment, the filter 1121' may be a band-pass filter. The filter 1121' passes the receiving frequency band (2400 MHz) of the first module 1100, and rejects the transmitting frequency band (1900 MHz) of the second module 1200. Therefore, interference caused by transmission of signals by the second module 1200 during reception of signals by the first module 1100 is reduced. In other embodiments, the filter 1121' may be a high-pass filter, and a specification thereof may be designed according to different requirements.

Figure 8:
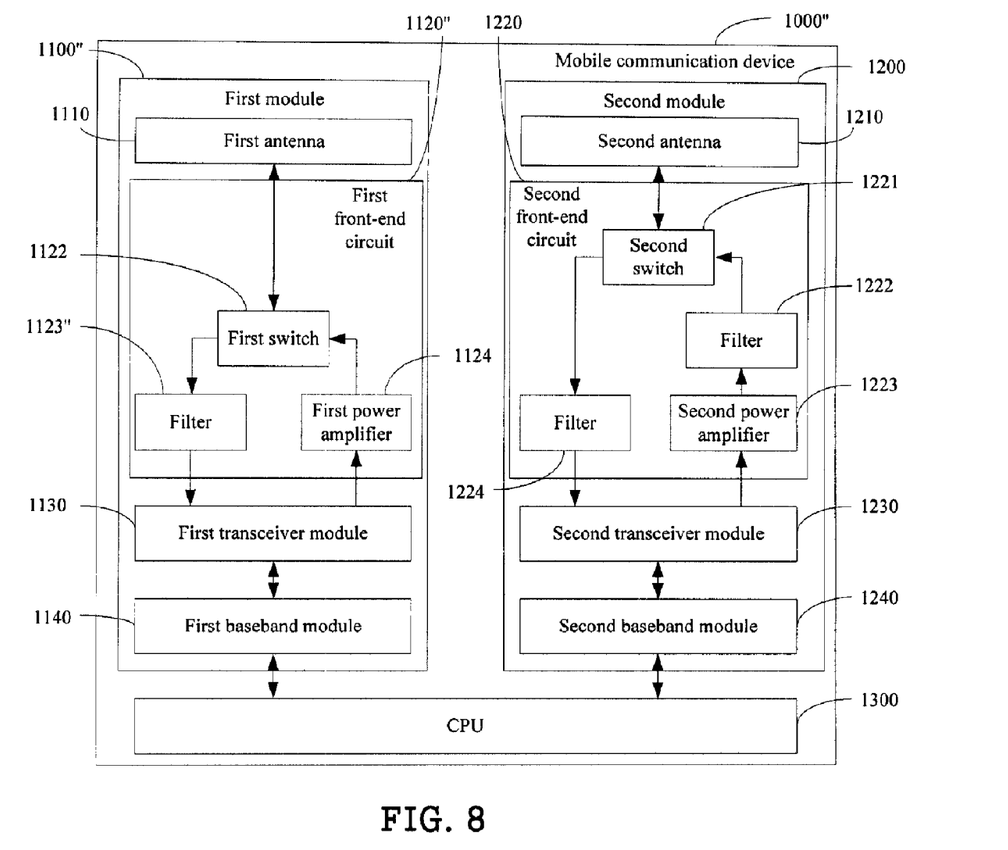
FIG. 8 is a schematic diagram of functional modules of a mobile communication device of a further exemplary embodiment of the invention.

FIG. 8 is a schematic diagram of functional modules of a mobile communication device 1000" of a further exemplary embodiment of the present invention. The mobile communication device 1000" of this exemplary embodiment is similar to the mobile communication device 1000 of FIG. 3, with a difference being that a first front-end circuit 1120" of the mobile communication device 1000" includes the first switch 1122, a filter 1123", and a first power amplifier 1124, eliminating the filter 1121 of FIG. 3. The first power amplifier 1124, connected between the first switch 1122 and the first transceiver module 1130, amplifies signals from the first transceiver module 1130. The filter 1123", connected between the first switch 1122 and the first transceiver module 1130, filters signals from the first switch 1122.

In the exemplary embodiment, the filter 1123" may be a band-pass filter. The filter 1123" passes the receiving frequency band (2400 MHz) of the first module 1100, and rejects the transmitting frequency band (1900 MHz) of the second module 1200. Therefore, interference caused by transmission of signals by the second module 1200 during reception of signals by the first module 1100 is reduced. In other embodiments, the filter 1123" may be a high-pass filter, and a specification thereof may be designed according to different requirements.

The first front-end circuits 1120, 1120', or 1120" of the first modules 1100, 1100', or 1100" and the second front-end circuit 1120 of the second module 1200 reduce interference caused by transmission of signals by the second module 1200 during reception of signals by the first module 1100.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A mobile communication device, comprising: a central processing unit (CPU), for processing signals;
   a first antenna, for transmitting and receiving first signals;
   a first front-end circuit between the first antenna and the CPU, and connected to the first antenna, the first front-end circuit comprising: a first switch, for switching between transmitting and receiving functions of the first front-end circuit;
   a first power amplifier directly connected between the first switch and a first transceiver module, for amplifying signals from the CPU; and
   a first filter directly connected between the first switch and said first antenna, for filtering signals from the first antenna;
   a second antenna, for transmitting and receiving second signals; and
   a second front-end circuit located between the second antenna and the CPU, and connected to the second antenna, the second front-end circuit comprising: a second switch directly connected between the second antenna and a second filter, for switching between transmitting and receiving functions of the second front-end circuit;
   a second power amplifier directly connected between said second filter and a second transceiver module, for amplifying signals from the CPU;
   said second filter directly connected between the second switch and the second power amplifier, for filtering signals from the second power amplifier;
   and at least one third filter directly connected between the second switch and said second transceiver module, for filtering signals from the second switch;
   wherein the first signals comprise IEEE 802.11b/g frequency band signals, and the second signals comprise global system for mobile communication (GSM) frequency band signals.

2. The mobile communication device as claimed in claim 1, further comprising:
   a first baseband module connected to the CPU, for modulating signals from the CPU; and
   a first transceiver module connected between the first front-end circuit and the first baseband module, for up converting signals from the first baseband module.

3. The mobile communication device as claimed in claim 2, wherein the first baseband module is further used for demodulating signals from the first transceiver module, and the first transceiver module is further used for down converting signals from the first front-end circuit.

4. The mobile communication device as claimed in claim 1, further comprising:

a second baseband module connected to the CPU, for modulating signals from the CPU; and a second transceiver module connected to the second front-end circuit and the second baseband module, for up converting signals from the second baseband module.

5. The mobile communication device as claimed in claim 4, wherein the second baseband module is further used for demodulating signals from the second transceiver module, and the second transceiver module is further used for down converting signals from the second front-end circuit.

6. The mobile communication device as claimed in claim 1, wherein the first filter comprises at least a selective one of a band-pass filter and a high-pass filter.

7. The mobile communication device as claimed in claim 1, wherein the second filter comprises at least a selective one of a band-pass filter, a low-pass filter and a notch filter.

8. The mobile communication device as claimed in claim 1, wherein the third filter comprises a band-pass filter.

9. The mobile communication device as claimed in claim 1, wherein the first filter is connected to the first antenna.

10. The mobile communication device as claimed in claim 9, further comprising a fourth filter connected to the first switch, for filtering signals from the first switch.

11. The mobile communication device as claimed in claim 10, wherein the first signals comprise IEEE 802.11b/g frequency band signals.

12. The mobile communication device as claimed in claim 11, wherein the fourth filter comprises at least a selective one of a band-pass filter and a high-pass filter.

13. The mobile communication device as claimed in claim 1, wherein the first switch is connected to the first antenna, and the first filter further filters signals from the first switch.

* * * * *